(12) United States Patent
Kamarshi et al.

(10) Patent No.: US 10,514,256 B1
(45) Date of Patent: Dec. 24, 2019

(54) SINGLE SOURCE MULTI CAMERA VISION SYSTEM

(71) Applicant: Amazon Technologies, Inc., Seattle, WA (US)

(72) Inventors: Vijay Kamarshi, Cupertino, CA (US); Robert Warren Sjoberg, San Francisco, CA (US); Menashe Haskin, Palo Alto, CA (US); Amit Tikare, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 689 days.

(21) Appl. No.: 13/888,047

(22) Filed: May 6, 2013

(51) Int. Cl.
  *G01C 3/08* (2006.01)
(52) U.S. Cl.
  CPC ...................... *G01C 3/08* (2013.01)
(58) Field of Classification Search
  CPC ........................................................ G01C 3/08
  See application file for complete search history.

(56) References Cited

U.S. PATENT DOCUMENTS

| | | | |
|---|---|---|---|
| 4,274,288 A | 6/1981 | Tittmann et al. | |
| 4,820,041 A | 4/1989 | Davidson et al. | |
| 7,187,343 B2 | 3/2007 | Pate | |
| 7,418,392 B1 | 8/2008 | Mozer et al. | |
| 7,525,116 B2 | 4/2009 | Suzuki | |
| 7,720,683 B1 | 5/2010 | Vermeulen et al. | |
| 7,774,204 B2 | 8/2010 | Mozer et al. | |
| 7,845,878 B1 | 12/2010 | Godbersen et al. | |
| 8,542,276 B2 | 9/2013 | Huang et al. | |
| 8,988,662 B1* | 3/2015 | Haskin ...................... | G01C 3/08 356/28.5 |
| 9,109,886 B1* | 8/2015 | Haskin ...................... | G01C 3/08 |
| 9,429,833 B1* | 8/2016 | Satoh ....................... | G06F 3/042 |
| 2002/0131024 A1 | 9/2002 | Keenan et al. | |
| 2003/0163287 A1 | 8/2003 | Vock et al. | |
| 2004/0066499 A1 | 4/2004 | Rheme et al. | |

(Continued)

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

(Continued)

*Primary Examiner* — Ryan A Lubit
(74) *Attorney, Agent, or Firm* — Lee & Hayes, P.C.

(57) ABSTRACT

In some examples, a vision system includes multiple time of flight (ToF) cameras and a single illumination source. The illumination source and the multiple ToF cameras may be synchronized with each other, such as through a phase locked loop based on a generated control signal. A first one of the ToF cameras may be co-located with the illumination source, and a second one of the ToF cameras may be spaced away from the illumination source and the first ToF camera. For instance, the first ToF camera may have a wider field of view (FoV) for generating depth mapping of a scene, while the second ToF camera may have a narrower FoV for generating higher resolution depth mapping of a particular portion of the scene, such as for gesture recognition.

19 Claims, 11 Drawing Sheets

(56) References Cited

U.S. PATENT DOCUMENTS

| | | |
|---|---|---|
| 2005/0089069 A1 | 4/2005 | Ozasa et al. |
| 2005/0128437 A1 | 6/2005 | Pingali et al. |
| 2007/0287091 A1 | 12/2007 | Jacobo et al. |
| 2008/0036187 A1 | 2/2008 | Breed |
| 2009/0079813 A1* | 3/2009 | Hildreth ................ H04N 7/147 348/14.03 |
| 2011/0228098 A1* | 9/2011 | Lamb .................... G01S 17/023 348/164 |
| 2012/0223885 A1 | 9/2012 | Perez |
| 2013/0201167 A1* | 8/2013 | Oh .................... H01L 27/14656 345/207 |
| 2014/0071245 A1* | 3/2014 | Zhang ................. H04N 13/239 348/47 |
| 2014/0168262 A1* | 6/2014 | Forutanpour ......... G06T 19/006 345/633 |
| 2014/0240464 A1* | 8/2014 | Lee ........................ G01S 17/08 348/47 |
| 2014/0320668 A1* | 10/2014 | Kalevo ............. H04N 5/23212 348/169 |
| 2015/0002664 A1* | 1/2015 | Eppinger ................ G06T 7/004 348/142 |
| 2015/0292884 A1* | 10/2015 | Fuchikami ............. G01P 13/00 348/135 |

OTHER PUBLICATIONS

Office Action for U.S. Appl. No. 13/647,603, dated Jan. 7, 2015, Menashe Haskin, "Time-of-Flight of Light Calibration," 9 pages.

Office Action for U.S. Appl. No. 13/632,570, dated Nov. 22, 2013, Menashe Haskin, "Time-of-Flight Calculations Using a Shared Light Source," 22 pages.

Final Office Action U.S. Appl. No. 13/632,570, dated May 8, 2014, Menashe Haskin, "Time-of-Flight Calculations Using a Shared Light Source," 24 pages.

Office action for U.S. Appl. No. 13/842,420 dated Sep. 2, 2015, Satoh et al., "Projection and Camera System with Repositionable Support Structure," 10 pages.

* cited by examiner

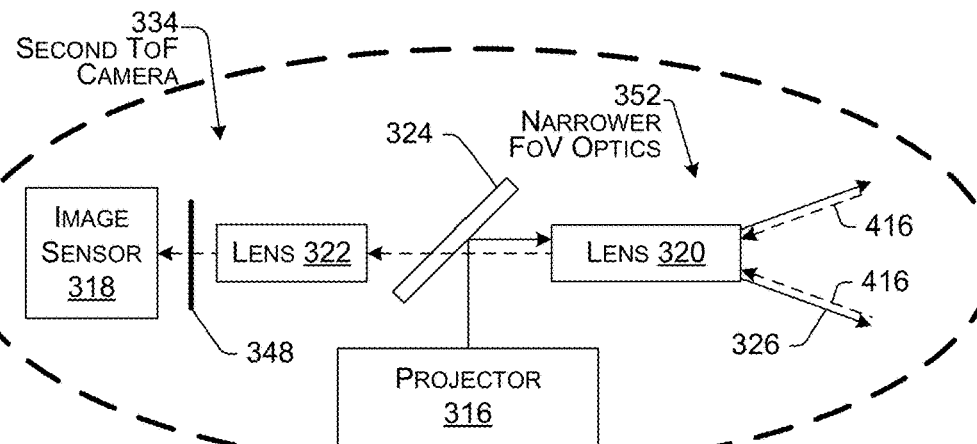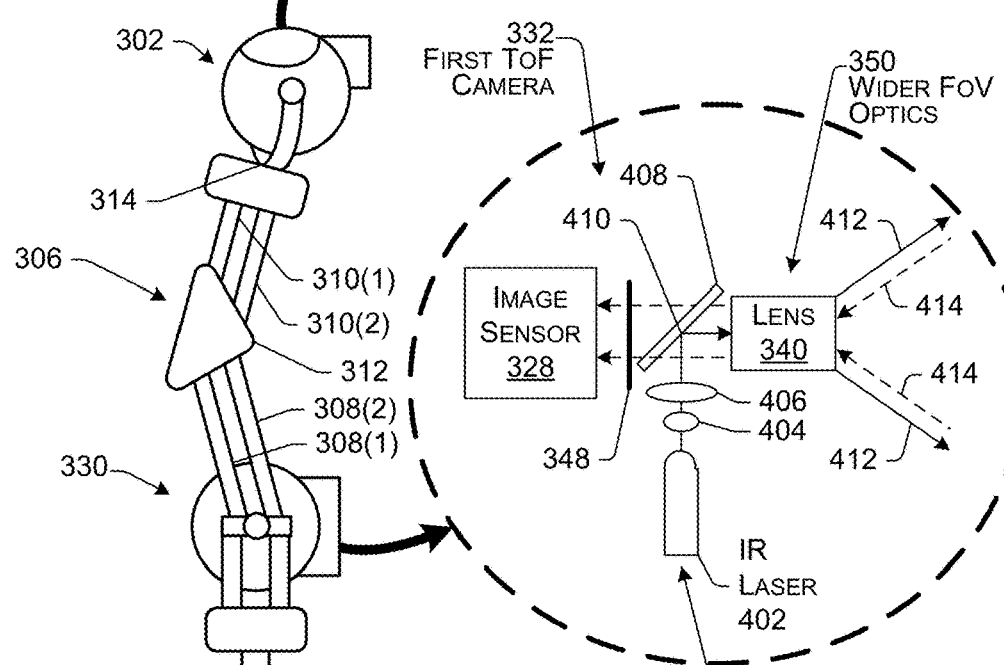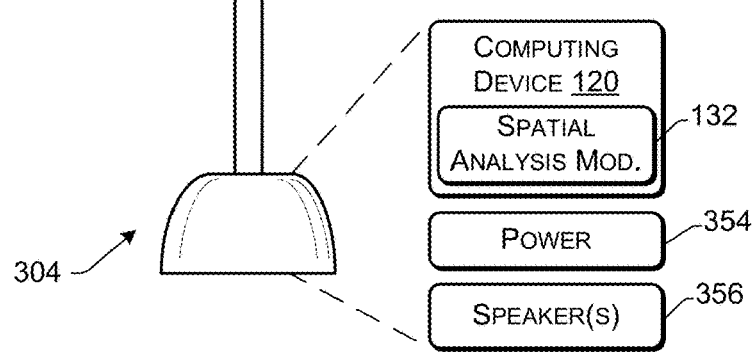
FIG. 4

900 ─┐

```
┌─────────────────────────────────────────────────────────────┐
│  PROVIDE A FIRST ToF CAMERA CO-LOCATED WITH AN ILLUMINATION │
│  SOURCE, THE FIRST ToF CAMERA INCLUDING A FIRST IMAGE SENSOR,│
│    THE ILLUMINATION SOURCE EMITTING MODULATED ILLUMINATION   │
│                            902                               │
└─────────────────────────────────────────────────────────────┘
                              │
                              ▼
┌─────────────────────────────────────────────────────────────┐
│   PROVIDE A SECOND ToF CAMERA INCLUDING A SECOND IMAGE       │
│  SENSOR, WHEREIN THE SECOND ToF CAMERA IS SPACED AWAY FROM   │
│       THE FIRST ToF CAMERA AND THE ILLUMINATION SOURCE       │
│                            904                               │
└─────────────────────────────────────────────────────────────┘
                              │
                              ▼
┌─────────────────────────────────────────────────────────────┐
│   RECEIVE FIRST DATA FROM THE FIRST IMAGE SENSOR, THE FIRST  │
│   DATA BASED AT LEAST IN PART ON A FIRST PORTION OF REFLECTED│
│       ILLUMINATION RECEIVED BY THE FIRST IMAGE SENSOR        │
│                            906                               │
└─────────────────────────────────────────────────────────────┘
                              │
                              ▼
┌─────────────────────────────────────────────────────────────┐
│  RECEIVE SECOND DATA FROM THE SECOND IMAGE SENSOR, THE       │
│  SECOND DATA BASED AT LEAST IN PART ON A SECOND PORTION OF   │
│  REFLECTED ILLUMINATION RECEIVED BY THE SECOND IMAGE SENSOR  │
│                            908                               │
└─────────────────────────────────────────────────────────────┘
                              │
                              ▼
┌─────────────────────────────────────────────────────────────┐
│  DETERMINE A DISTANCE FROM A SURFACE IN THE SCENE TO THE     │
│  SECOND ToF CAMERA BASED AT LEAST IN PART ON THE FIRST DATA  │
│                      AND THE SECOND DATA                     │
│                            910                               │
└─────────────────────────────────────────────────────────────┘
```

```
┌─────────────────────────────────────────────────────────┐
│  POSITION A FIRST ToF CAMERA AND A SECOND ToF CAMERA SPACED │
│  AWAY FROM EACH OTHER, WHEREIN THE FIRST ToF CAMERA     │
│  INCLUDES A FIRST IMAGE SENSOR, THE SECOND ToF CAMERA   │
│  INCLUDES A SECOND IMAGE SENSOR, AND THE FIRST ToF CAMERA│
│  INCLUDES A CO-LOCATED ILLUMINATION SOURCE              │
│                          1002                           │
└─────────────────────────────────────────────────────────┘
                              │
                              ▼
┌─────────────────────────────────────────────────────────┐
│  SYNCHRONIZE A FREQUENCY OF MODULATION OF ILLUMINATION  │
│  EMITTED BY THE ILLUMINATION SOURCE WITH A FREQUENCY OF │
│  MODULATION OF THE FIRST IMAGE SENSOR AND A FREQUENCY OF│
│  MODULATION OF THE SECOND IMAGE SENSOR                  │
│                          1004                           │
└─────────────────────────────────────────────────────────┘
```

FIG. 10

SINGLE SOURCE MULTI CAMERA VISION SYSTEM

BACKGROUND

A time of flight (ToF) system may be used for range and depth sensing, such as for determining distances to an object or other surface. For example, a ToF system may include an illumination source and a ToF camera including an image sensor. The illumination source may direct a wave of electromagnetic energy, (typically near infrared (IR) light) toward a target surface. The image sensor of the ToF camera may receive the reflected IR energy wave. The distance to the target surface may be calculated based on a measured phase shift between the radiated and reflected waves of IR energy. However, limited capabilities of conventional ToF systems may reduce their usefulness for various types of applications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates an implementation of a projection and image capturing system resembling a table lamp similar to the implementation illustrated in FIG. 3. In this example, an illumination component may share an optical path with an image sensor of one of the ToF cameras.

FIG. 9 is an example flow diagram of a process for controlling a vision system including a first ToF camera co-located with an illumination source and a second ToF camera.

FIG. 10 is an example flow diagram of a process for controlling a vision system including a first ToF camera co-located with an illumination source and a second ToF camera.

DETAILED DESCRIPTION

Figure 1:
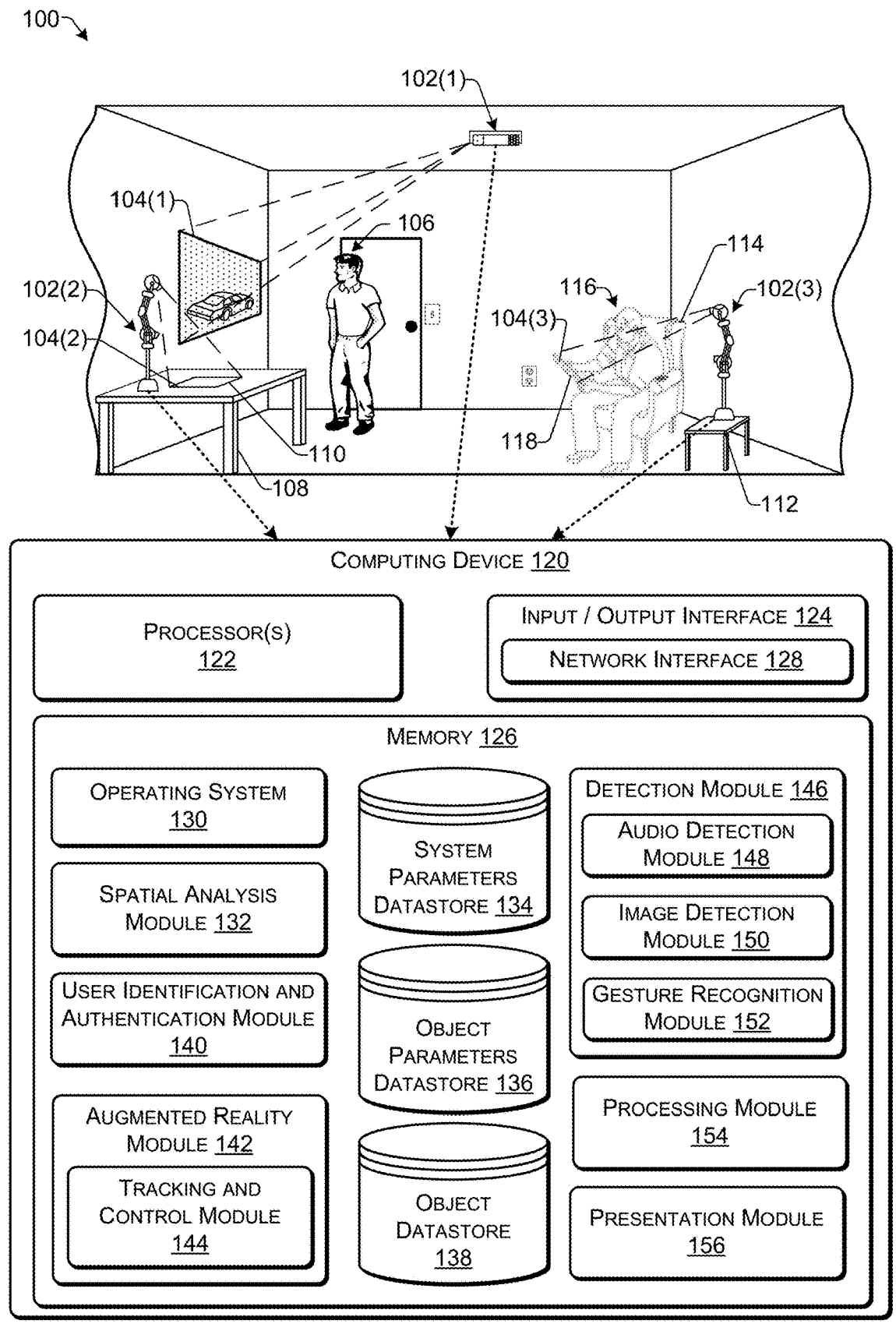
FIG. 1 illustrates an example environmental area, such as a room, in which some implementations of the computer vision techniques and arrangements described herein may be employed.

This disclosure describes techniques and arrangements for a time of flight (ToF) vision system. Some implementations include multiple ToF cameras having different fields of view (FoV) to improve the vision system's detection capabilities in both narrow and wide fields of view. For example, conventional ToF vision systems may provide only a single or fixed FoV. On the other hand, implementations herein may include multiple ToF cameras, such as a first ToF camera including first optics configured to receive reflected illumination over a wide FoV, and a second ToF camera including second optics configured to receive reflected illumination through a narrower FoV. As one example, the wider FoV may be used for coarse detection of a scene including one or more objects in the general vicinity of the vision system, and the narrower FoV may be used for higher resolution depth mapping of a particular one of the objects. For instance, the ToF distance data obtained from the wider FoV camera may be used for determining a location of an object of interest within the scene. The narrower FoV camera may then be aimed at and/or focused on the location of the object of interest for enabling higher resolution detection of the object, such as for detecting movement of the object, detecting gestures made with the object, and so forth.

In some implementations, the vision system includes a single illumination source and at least two ToF cameras, with a first ToF camera having a wider FoV, and a second ToF camera having a narrower FoV. In some examples, the illumination source may be a source of infrared (IR) energy, such as an IR light emitting diode (LED) or an IR laser diode, although other types and/or wavelengths of illumination sources may be used in other examples. One of the ToF cameras may be co-located with the illumination source, i.e., the illumination may be emitted from substantially the same location as the co-located ToF camera. A control signal from a clock or other oscillator may drive both the illumination source and the image sensor in the co-located ToF camera. The control signal may modulate the illumination source, causing the illumination source to emit a wave of IR light in the direction of a scene within the FoV of the co-located ToF camera. The illumination signal reflects off one or more surfaces within the scene, and the reflected illumination signal is received by the image sensor of the co-located ToF camera. As one example, the image sensor may be modulated at the same frequency as the illumination source, and a phase difference between the emitted illumination signal and the reflected illumination signal may indicate the ToF or travel time of the reflected illumination. Since the image sensor includes multiple pixels, each pixel may provide a measurement of the time that the illumination signal has taken to travel from the illumination source to an object surface and back to the ToF camera sensor.

In some implementations, the distance to a surface is determined based on a phase shift between the signal emitted by the illumination source and the signal received by the image sensor. Since the illumination source, the ToF camera image sensor, and the driving electronics, such as an oscillator, may be co-located for the first ToF camera, the control signal from the oscillator can be delivered to both illumination source and the image sensor concurrently. As one example, if the illumination is emitted from a location within several centimeters of the ToF camera, the illumination source may be considered to be co-located with the ToF camera. In some cases, the first ToF camera that is co-located with the illumination source may have a wide FoV, and may be suitable for imaging a wide area or region of the overall scene with limited precision.

Furthermore, a second ToF camera having a narrower FoV may be located in a separate location from the first ToF camera, but may also be oriented to receive illumination from the same illumination source as the first ToF camera. For example, the second ToF camera may be spaced away from the first ToF camera such that the second ToF camera is not co-located with the illumination source. Thus, the second ToF camera is spaced away from the first ToF camera and the illumination source by a known or unknown distance. In some cases, the distance between the two ToF cameras may be determined using calibration techniques or various other techniques. Further, the distance that the ToF cameras are spaced apart from one another may change or may be changeable, such as by moving one or both of the ToF cameras and/or the illumination source. For instance, the second ToF camera may be located in another part of an overall system, such as for sharing optics with other components, such as a projector of the system; for being mounted on an articulated arm to enable aiming and focusing of the second ToF camera; and/or for reducing power consumption of a portion of the system.

As one example, the first ToF camera may have a wider FoV to map one or more objects in the scene and provide ToF data used to roughly identify the one or more objects (e.g., as a potential hand or a potential display surface, etc.). Further, the second ToF camera may have a narrower FoV and may be mounted on a support that can be remotely controlled for aiming the second ToF camera at various parts of the scene. Thus, the second ToF camera may be capable of being positioned to receive the reflected illumination signal from a more focused or smaller region of the scene. For example, the second ToF camera may be focused on a particular one of the objects in the scene, such as a hand of a user. Accordingly, the second ToF camera may be used for detecting gestures made by the user, such as for controlling or interacting with a computing device, a projected image, or the like. Consequently, the second ToF camera having the narrow FoV is able to obtain higher-resolution images of the particular object than can be obtained by the first ToF camera having the wider FoV.

One or more modules on a computing device may receive the ToF data from the first ToF camera and may use computer vision techniques to interpret the ToF data obtained through the wider FoV. The one or more modules may then orient the second ToF camera having the narrower FoV to a specific area in the scene from which to obtain more precise ToF data. In addition, a common coordinate system may be established between the wider FoV ToF camera and the narrower FoV ToF camera. For instance, the wider FoV ToF camera may be fixed or generally immobile in some examples, while the narrower FoV ToF camera may be mobile and remotely controllable by the computing device for focusing on various different objects within a scene.

In some examples, the multiple ToF cameras in the vision system are synchronized with the illumination source. For example, synchronization may help ensure that the same control signal triggers or modulates all the components in the vision system. Thus, synchronization ensures that the time difference between a control signal and the actual effect of the control signal at each component is measurable and stable. As one example, a control signal generator may transmit the control signal to the illumination source and the first and second ToF cameras. Each of the three components may have its own control signal generator or oscillator that is phase locked to the control signal. The phase locking synchronizes the frequencies of the multiple oscillators, but allows differences in phase. When the phase lock has been established, a calibration procedure may be used to measure the time difference between a locally generated control signal and the incoming signal from control signal generator.

After a common control signal time reference has been established for modulating the image sensor of the second ToF camera with the illumination source, the distances between an object surface and the second ToF camera can be determined. Initially, a first distance from the wider FoV ToF camera to the object is determined based on the ToF data obtained by the image sensor of the first ToF camera. Next, a total distance from the illumination source to the object, and from the object to the second ToF camera may be determined based on the ToF data obtained by the image sensor of the second ToF camera. Therefore, the actual distance between the object and the second ToF camera can be determined by subtracting the first distance from the total distance.

In addition, in some cases, more than two ToF cameras may be employed in the vision system herein. As one example, the vision system may include a single illumination source, a wider FoV ToF camera co-located with the illumination source, and multiple narrower FoV ToF cameras. Each of the multiple ToF cameras may be spaced apart from one another and synchronized with each other and with the illumination source, such as through the phase locking technique discussed above. When the vision system includes multiple narrower FoV ToF cameras, the vision system may be able to perceive a particular object from multiple angles for obtaining more information about the particular object. Additionally, in the case that the FoV of one of the narrower FoV ToF cameras is partially obstructed by other objects or by another portion of the vision system, the other narrower FoV ToF camera may obtain depth information for a particular target. As another alternative, a first narrower FoV ToF camera may be focused on a first object such as a left hand of a user, and a second narrower FoV ToF camera may be focused on a second object, such as a right-hand of the user. Additionally, as another variation, the vision system may also include multiple wider FoV ToF cameras, in addition to as or as an alternative to one or more narrower FoV cameras. For example, one of the wider FoV ToF cameras may be co-located with the illumination source, and another wider FoV camera may be positioned for capturing image information of the scene from a different angle or perspective. Numerous other variations will be apparent to those of skill in the art having the benefit of the disclosure herein.

Some examples herein include an augmented reality system or projection system that may project one or more visible light images onto one or more display surfaces. The vision system herein may be used for various purposes, such as to detect human movement, human gestures, the presence of certain objects, and the like. For instance, gestures may be used for interaction with the augmented reality system and an associated computing device. In some cases, the illumination from the illumination source is emitted within an environment of the augmented reality system, such as for reflecting off of a user's hand to provide gesture recognition. As one example, the gesture recognition may enable interaction with a graphic user interface projected onto a display surface.

In some implementations, a user interacts with a projection system that includes a combined vision system and projection apparatus. A computing device associated with the projection system may use the ToF data from the ToF cameras herein to establish one or more depth maps based on the data from the ToF cameras, and may use the depth map to identify any detected gestures. Accordingly, the user is able to interact with a projected image and/or the computing device using gestures that are recognized by the vision system. The projection system may include a gesture recognition module that is executed on the computing device to allow a user to interact with projected images, such as graphic interfaces.

The vision and projection systems described herein may be employed in a variety of environments such as conference rooms, classrooms, homes, offices, commercial environments, retail environments, and so forth. In some examples, the vision and projection systems herein may be used in augmented reality environments that include systems of resources such as cameras, projectors, vision systems, range finders, computing devices with processing and memory capabilities, and so forth, which may perform the processes described herein. For example, the projectors may project images onto the surroundings that define the environment or may cause various operations to be performed within the environment. Moreover, cameras and microphones may monitor and capture user interactions with devices, objects and images, and these inputs may be used, in part, to determine one or more images to present to a user.

Some implementations may include an augmented reality functional node (ARFN) that is configured to dynamically accommodate motion and tilt in three-dimensional space. For example, a projector of the ARFN projects light onto a fixed or mobile projection display surface. In some cases, the display surface may be handheld and may change in one or both of its distance from the projector or its angle with respect to an optical axis between the projector and the display surface. In response to detecting a change in distance or angle of the display surface, the ARFN may dynamically perform a sequence of actions to accommodate the change.

The systems and techniques described herein may be implemented in many different manners. Several illustrative examples are described below in which the vision system is implemented as part of an augmented reality environment within a room. However, the vision system may be implemented in many other contexts and situations in which ToF cameras can be employed.

FIG. 1 depicts an example environment 100 in which a vision system may be used. The environment 100 may include one or more ARFNs (augmented reality functional nodes) 102 having one or more ToF cameras associated therewith. Further, in other examples, the ToF cameras are not associated with an ARFN, but may instead be included as a stand-alone vision system, such as may be associated with a monitoring system, a computer system, a gaming system, a videoconferencing system, a security system, or the like. For example, the vision system herein may be associated with any type of computing device, home electronics, consumer electronics, automotive electronics, commercial electronics, and so forth.

In FIG. 1, the environment 100 includes three ARFNs 102(1)-(3) shown within a room. Each ARFN 102 contains projectors, cameras, vision systems and computing resources that are used to generate the augmented reality environment 100. In this illustration, the first ARFN 102(1) is a fixed mount system that may be mounted within the room, such as mounted to the ceiling, although other placements are contemplated. The first ARFN 102(1) projects images onto the scene, such as onto a display surface 104(1) on a wall of the room. A first user 106 may watch and interact with the images projected onto the wall, and the ceiling-mounted ARFN 102(1) may capture that interaction. In addition, the ARFN 102(1) may detect a location of the user or actions taken by the user within the room (e.g., gestures) or sounds output by the user. In response, the ARFN 102(1) may identify operations associated with those locations, gestures or sounds and cause those operations to be performed within the room. The ARFN 102(1) may further include one or more ToF cameras, such as to detect a distance to a display surface, a body part of a user, or to another object, such as for generating a depth map. One implementation of the first ARFN 102(1) is provided below in more detail with reference to FIG. 2.

A second ARFN 102(2) may be embodied to resemble a table lamp, which is shown sitting on a desk or table 108 in the example of FIG. 1. The second ARFN 102(2) projects one or more images 110 onto a display surface 104(2) of the desk 108, and the user 106 may view and interact with the projected image 110. The projected image 110 may be of any number of things, such as homework, video games, news, movies, television shows, recipes, a graphic interface, and so forth.

A third ARFN 102(3) is also embodied to resemble a table lamp, shown sitting on a small table 112 next to a chair 114. A second user 116 is seated in the chair 114, holding a user device 118. The third ARFN 102(3) projects an image onto a display surface 104(3) of the user device 118 for the user 116 to consume and interact with the projected image. The projected images may be of any number of things, such as books, games (e.g., crosswords, Sudoku, etc.), news, magazines, movies, television shows, a browser, a graphic interface, etc. The user device 118 may be essentially any device for use within an augmented reality environment, and may be provided in several form factors. The user device 118 may range from an entirely passive, non-electronic, mechanical surface to a fully functioning, fully processing, electronic device with a projection display surface. For instance, the user device 118 may be a display surface or display medium that includes one or more features with which the user may interact.

Associated with each ARFN 102(1)-(3), or with a plurality of ARFNs 102, is a computing device 120, which may be located within the augmented reality environment 100 or disposed at another location external to the environment 100. Each ARFN 102 may be connected to the computing device 120 via a wired network, a wireless network, or a combination of the two. The computing device 120 has a processor 122, an input/output interface 124 and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as ToF cameras, projectors, visible light cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth®, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium that can be used to store the desired information and which can be accessed by a computing device. For example, the CRSM may be a non-transitory computer-readable medium.

One or more modules such as instructions, datastores, and so forth may be stored within the memory 126 and configured to execute on a processor, such as the processor 122. An operating system module 130 is configured to manage hardware and services within and coupled to the computing device 120 for the benefit of other modules. In some examples, the operating system module 130 may present a graphic user interface to enable a user to interact with the ARFN(s) 102 and/or displayed content.

A spatial analysis module 132 is configured to perform several functions, which may include analyzing a scene to generate a topology, recognizing objects in the scene, dimensioning the objects, and creating a three-dimensional (3D) model or depth map of the scene. Characterization may be facilitated using any suitable technologies including structured light, light detection and ranging (LIDAR), optical time-of-flight, ultrasonic ranging, stereoscopic imaging, radar, and so forth, either alone or in combination with one another. For convenience, and not by way of limitation, some of the examples in this disclosure refer to structured light, which may include non-visible (e.g., IR) structured light, which may be used with the ToF cameras herein or with other vision systems. Further, in other examples, the light is not structured light. The spatial analysis module 132 employs the information obtained from the vision system within the augmented reality environment to provide an interface between the physicality of the scene and virtual objects and information. Accordingly, in some examples, the spatial analysis module may receive an input from the vision system pertaining to received ToF data from one or more ToF cameras. The spatial analysis module 132 may distinguish gestures, control inputs, and the like from other information in the received non-visible light for enabling gesture recognition.

A system parameters datastore 134 is configured to maintain information about the state of the computing device 120, the input/output devices of the ARFN 102, and so forth. For example, system parameters may include current pan and tilt settings of the cameras and projectors, an orientation of a projector toward a display surface, distances from the projector to the display surface, and so forth. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene that are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

In addition, the object datastore 138 may maintain a library of sounds or particular frequencies that are associated with different operations that may be performed within the environment. As a result, upon one of the ARFNs 102 detecting a particular sound or frequency within the environment, the ARFN may identify a corresponding operation (e.g., adjust volume, project an image to a particular display surface, etc.) and then cause that operation to be performed.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. In some examples, the augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items. In some examples, as discussed additionally below, based on input from one or more of the ToF cameras, or other sensors, cameras, or the like, the tracking and control module 144 may track the position of a user.

In addition, and as stated above, the memory 126 may maintain, or may be otherwise associated with, a detection module 146. As shown, the detection module 146 may include an audio detection module 148, an image detection module 150 and a gesture recognition module 152. In various implementations, a user 106 may interact with the environment for the purpose of causing one or more operations to be performed within the environment. For example, the audio detection module 148 may detect (e.g., via a microphone) sounds or voice commands. Further, the image detection module 150 may detect one or more objects, faces, or the like, such as based on input from the spatial analysis module 132 and/or one or more vision system ToF cameras, visible light cameras or other sensors.

In addition, the gesture recognition module 152 may recognize one or more actions or gestures performed by the user, such as based on input from the spatial analysis module 132 and/or one or more vision system detectors, such as ToF cameras or other sensors. The gesture recognition module 152 uses various capabilities of the ARFN 102 to detect and recognize gestures or other actions made by the user in the environment 100. The gesture recognition module 152 may process the IR light data and/or perform various types of image processing, including three-dimensional (3D) environment analysis, to detect gestures. The gesture recognition module 152 may further analyze gestures to identify multiple possible candidate gestures, and then determine a most statistically probable gesture within the context of the gesture, such as based on content currently displayed on a display surface with which the user is interacting. Data indicative of detected gestures may be compared to stored gesture data in datastore 134 to identify the candidate gestures. When a statistically likely gesture is identified, the operation associated with the gesture is executed.

Upon detecting a particular action, gesture or other output by a user, a processing module 154 may determine one or more operations that are associated with the detected user output. In particular, the ARFN 102 may maintain or be associated with a database that maps various sounds, frequencies, gestures and/or user actions to particular operations that may be performed within the environment. That is, in response to the user 106 performing some action or gesture, the processing module 154 may identify a specific operation. If a desired display surface 104 for receiving a projected image has been identified by the processing module 154, a presentation module 156 may cause projection of a particular image or images onto the display surface. Accordingly, the presentation module 156 may cause an image to be projected, which may be caused by a user interacting with the environment.

Figure 2:
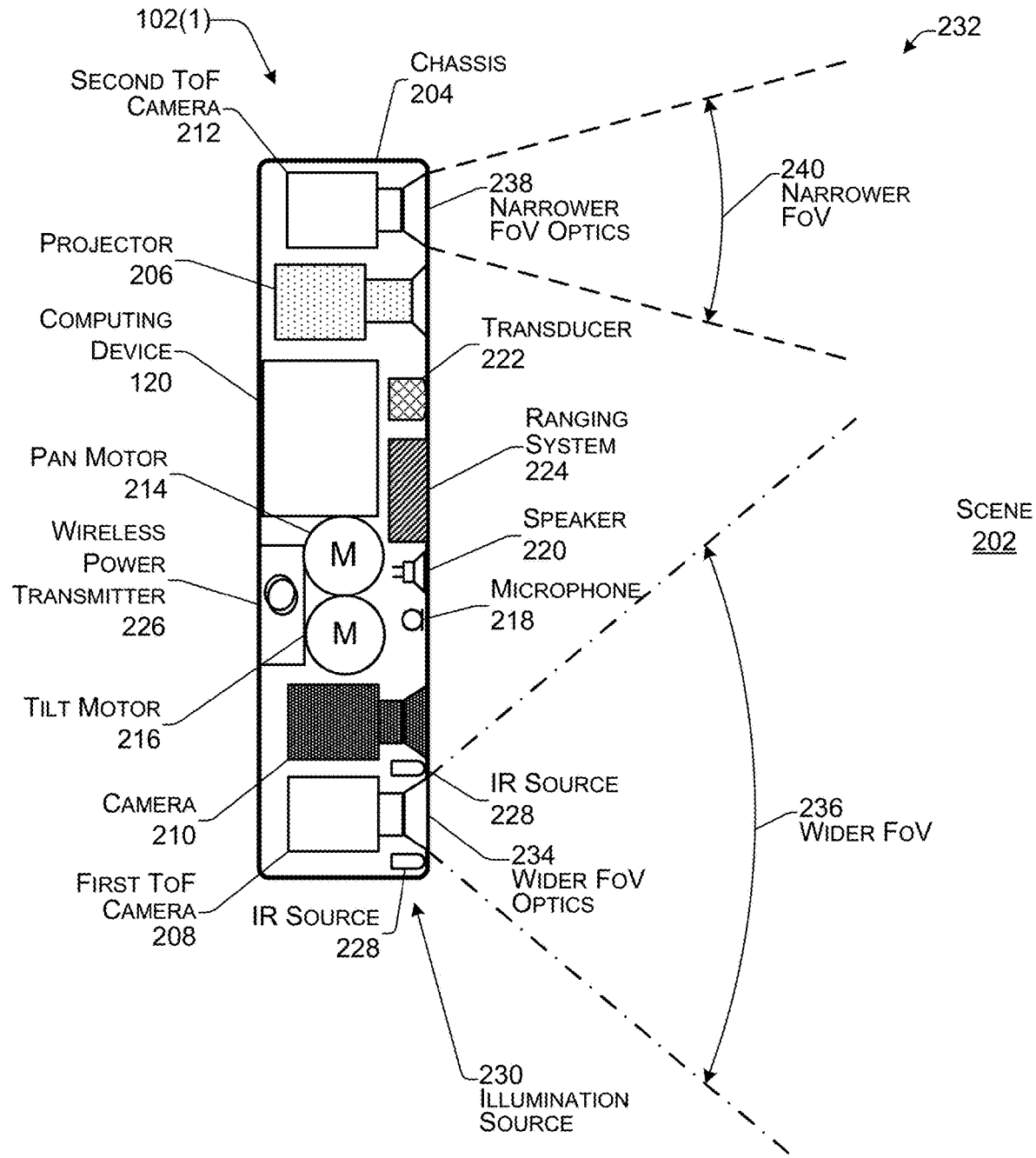
FIG. 2 illustrates an implementation of a projection and image capturing system including first and second ToF cameras spaced to one another, with an illumination source co-located with one of the ToF cameras.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display (LCD), 3LCD, and so forth. The projector 206 has a projector FoV that describes a particular solid angle. The projector FoV may vary according to changes in the configuration of the projector. For example, the projector FoV may narrow upon application of an optical zoom to the projector. In some implementations, a plurality of projectors 206 may be used. Further, in some implementations, the projector 206 may be further configured to project patterns, such as non-visible infrared patterns, that can be detected by one or more camera(s) and used for 3D reconstruction and modeling of the environment. The projector 206 may include a microlaser projector, a digital light projector (DLP), cathode ray tube (CRT) projector, liquid crystal display (LCD) projector, light emitting diode (LED) projector or the like.

A first ToF camera, 208, one or more visible light cameras 210, and a second ToF camera 212 may also be disposed within the chassis 204. The visible light camera 210 is configured to image the scene 202 in visible light wavelengths. The visible light camera 210 may be implemented in several ways. In some instances, the camera 210 may be embodied as a red, green, blue (RGB) camera 210. In other instances, the camera 210 may be a red, green, blue, z-depth (RGBZ) camera that includes both IR and RGB sensors. The camera 210 has a camera FoV, which describes a particular solid angle. The camera FoV may vary according to changes in the configuration of the camera 210. For example, an optical zoom of the camera 210 may narrow the camera FoV. In some implementations, a plurality of cameras 210 may be provided and, for example, may face in different directions.

The chassis 204 may be mounted with a fixed orientation, or may be coupled via an actuator to a fixture such that the chassis 204 may move or rotate. Actuators may include piezoelectric actuators, motors, linear actuators, and other devices configured to displace or move the chassis 204 or components therein such as the projector 206, the first ToF camera 208, the second ToF camera 212 and/or the camera 210. For example, in one implementation, the actuator may comprise a pan motor 214, a tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene 202 may be acquired. The spatial analysis module 132 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene and/or the user device 118. For example, the user may make a particular noise, such as a tap on a wall or snap of the fingers, which are pre-designated to initiate an augmented reality function. The user may alternatively use voice commands for interaction with the ARFNs. The user may also interact with the user device 118, which may cause the user device 118 to output particular sounds or frequencies. Such audio inputs may be located within the scene using time-of-arrival differences among the microphones and used to summon an active zone within the augmented reality environment. Further, the microphones 218 may be used to receive voice input from the user for purposes of identifying and authenticating the user.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer 222 may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, ultrasonic ranging, stereoscopic ranging, one or more interferometers, and so forth. In some implementations, the transducer 222, the microphones 218, the speaker 220, or a combination thereof may be configured to use echolocation or echo-ranging to determine distance and spatial characteristics. Further, any one of, or any combination of, the ranging system 224, the transducer 222, the camera 210, the ToF cameras 208 and 212, or other components of the ARFN may be used to determine the distance to an object, a display surface or the like.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as non-passive user device 118. The wireless power transmitter 226 may also be configured to transmit visible or non-visible light to communicate power. The wireless power transmitter 226 may utilize inductive coupling, resonant coupling, capacitive coupling, and so forth.

In this example, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by an offset between the projector 206, the ToF cameras, 208, 212 and the camera 210. This offset is the linear distance between the optical axes of the projector 206 and the cameras 208, 210 and 212. Placement of the projector 206 and the cameras 208, 210 and 212 at distance from one another may aid in the recovery of non-visible light and/or structured light data from the scene 202. The known projector/camera linear offset may also be used to calculate distances, dimensioning, and otherwise aid in the characterization of objects within the scene 202. In other implementations, the relative angle and size of the projector FoV and camera fields of view may vary. In addition, the angle of the projector 206 and the cameras 208, 210 and 212 relative to the chassis 204 may vary or may be variable by actuators.

Due to the offset, the projector 206 and cameras 208, 210 and 212 employ separate optical paths. That is, the projector 206 employs a set of lenses to project images along a first optical path, and the cameras 208, 210 and 212 employ different sets of lenses to image the scene by capturing the light scattered by the surroundings. In other examples, as discussed below, the projector 206 and a ToF camera may utilize the same optical path.

Furthermore, the ARFN 102(1) may include one or more IR light sources 228 as an illumination source 230 for illuminating the scene 202 with structured or nonstructured non-visible light. Accordingly, a vision system 232 may rely on non-visible light in addition to or instead of visible light for performing functions such as capturing user gestures, recognizing users, detecting objects in the scene 202, and so forth. In some examples, the IR light sources 228 may be a ring of multiple IR LEDs (light emitting diodes) arranged around the first ToF camera 208 to project IR light toward the scene 202. In other examples, the IR light source(s) 228 may include an IR laser, an IR laser diode, or any other suitable source of visible or non-visible light. For instance, the ToF cameras 208 and 212 may be capable of detecting modulated visible light, or ultraviolet light, in addition to or instead of non-visible IR light.

Each ToF camera 208, 210 has an FoV that may describe a particular solid angle. For example, the first ToF camera 208 may include wider FoV optics 234 corresponding to a wider FoV 236. Similarly, the second ToF camera 212 may include narrower FoV optics 238 corresponding to a narrower FoV 240, which is a narrower angle of view than an angle of view of the wider FoV 236. In some examples, the wider FoV optics 234 and/or the narrower FoV optics 238 may include a fixed lens having a fixed angle FoV. Alternatively, in other examples, the wider FoV optics 234 and/or the narrower FoV optics 238 may be adjustable such as by having an optical zoom type lens. For instance, the wider FoV 236 may be adjustable from a first wider FoV solid angle to a second wider FoV solid angle, such as between 180 and 60 degrees. Similarly, the narrower FoV 240 may be adjustable from a first narrower FoV solid angle to a second narrower FoV solid angle such as between 55 and 20 degrees. Furthermore, the foregoing angle values are merely examples for discussion purposes and are not intended to limit the possible FoVs of the ToF cameras herein.

As discussed above, a clock or other oscillator (not shown in FIG. 2) may modulate the illumination source 230 to direct modulated illumination toward the scene 202. The first ToF camera 208 having the wider FoV 236 may receive the reflected illumination with a first ToF image sensor (not shown in FIG. 2), and the second ToF camera 212 having the narrower FoV 240 may receive the reflected illumination with a second ToF image sensor (not shown in FIG. 2). The first ToF camera 208 and the second ToF camera 212 may provide the ToF data captured by the respective image sensors to the computing device 120, such as for mapping one or more surfaces in the scene 202. For example, the first ToF camera 208 may provide a course mapping of substantially the entire scene 202, while the second ToF camera 212 may provide a detailed higher-resolution mapping of a particular region or smaller portion of the scene 202.

Furthermore, in other implementations, the components of the ARFN 102(1) may be distributed in multiple locations within the environment 100. As mentioned above, microphones 218 and speakers 220 may be distributed throughout the scene 202. The projector 206 and the cameras 208, 210 and 212 may also each be located in separate chassis 204.

Figure 3:
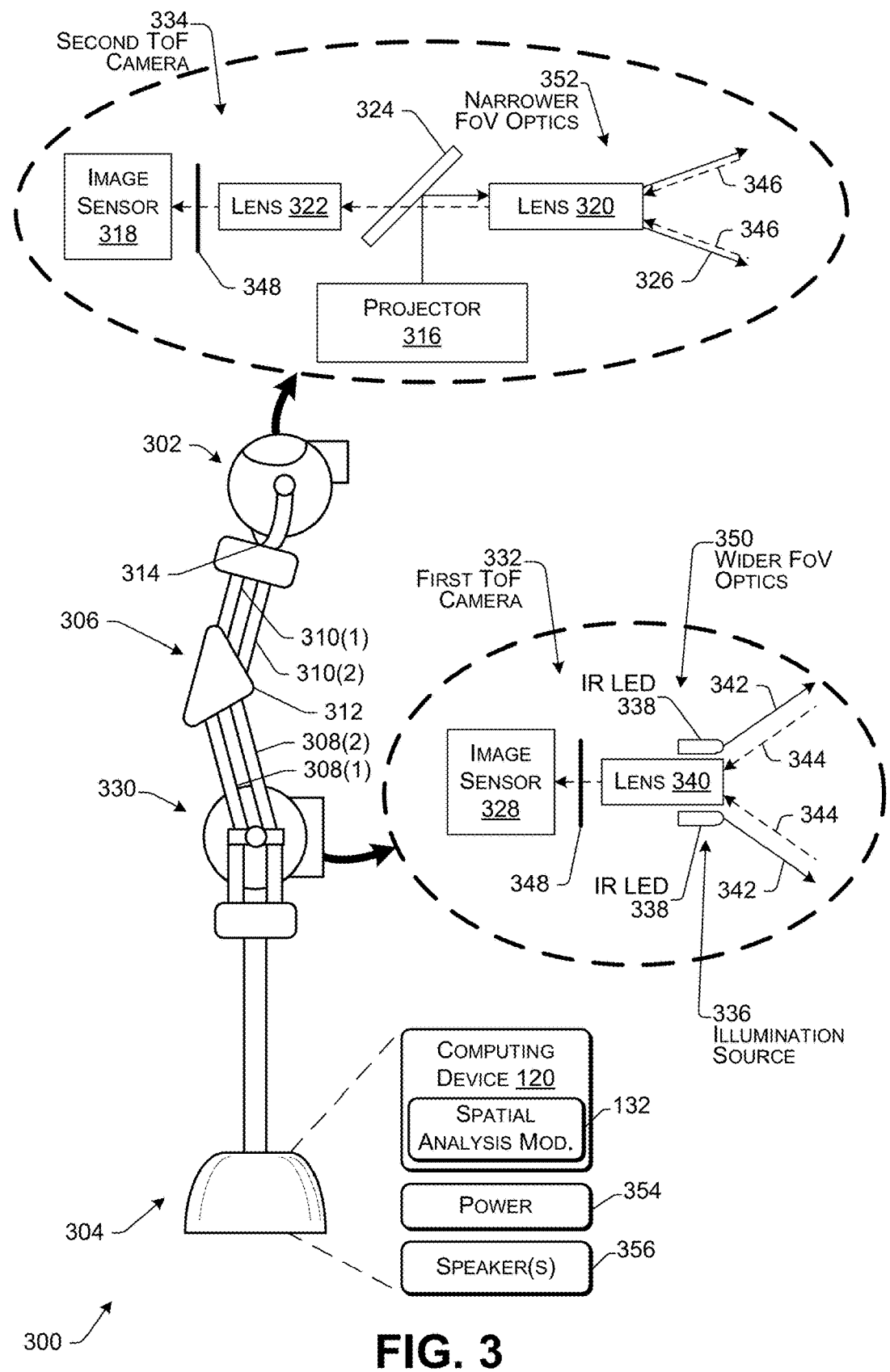
FIG. 3 illustrates an implementation of a projection and image capturing system resembling a familiar type of furniture, such as a table lamp including first and second ToF cameras spaced away from each another. In this example, a projector may share an optical path with an image sensor of one of the ToF cameras.

FIG. 3 illustrates one implementation 300 of the ARFN 102(2) or 102(3), implemented with the appearance of a table lamp, although the components may be incorporated into other types of furniture or other design configurations. While not all of the components discussed above are shown in FIG. 3, the ARFN 102 of FIG. 3 may include some or all of the components and functionality discussed above with respect to the ARFN 102(1) of FIG. 2. Further, the optical components described in this implementation may be embodied in a non-furniture arrangement, such as a stand-alone unit placed in the room or mounted to the ceiling or walls (i.e., similar to the ARFN 102(1) described above), or incorporated into fixtures such as a ceiling light fixture. The implementation 300 has a head 302 attached to a base 304 by a movable arm mechanism 306. As illustrated, the arm mechanism 306 has two base members or rods 308(1) and 308(2) connected to two head members or rods 310(1) and 310(2) via a joint connector 312. Other configurations of the arm mechanism 306 may be used.

In the illustrated implementation, the head 302 is connected to the arm mechanism 306 via a universal connector 314 that enables at least two degrees of freedom (e.g., along tilt and pan axes). The head 302 in this example is generally spherical, although it may be made of any shape, size or form factor. The head 302 may be pivotally mounted, such as within a U-shaped cradle, or other suitable support, to facilitate rotation about multiple axes. In some examples, one or more motors may be included (not shown in FIG. 3) to move the head about one or more axes to position or orient the head in a particular direction. Thus, the position of the head 302 may be remotely controlled by the computing device 120 and/or a user. Alternatively, in other implementations, the head 302 may be mounted to the arm mechanism 306 in a fixed manner, with no movement relative to the arm mechanism 306, or in a manner that enables more or less degrees of freedom. In still another implementation, a rotatable mounting may be coupled to the base 304 to enable rotation of the arm mechanism 306 and the head 304.

The head 302 may include several components, such as a projector 316 and a ToF image sensor 318. In this example, the image sensor 318 is configured to detect IR light reflected from objects within a scene or environment. The image sensor 318 may be implemented as part of a ToF camera. The head 302 also includes a first lens 320 and a second lens 322. The first lens 320 may be implemented in a number of ways, including as a fixed lens or as a zoom lens to provide a narrower FoV, as discussed above. When implemented as a zoom lens, the lens 320 may have any suitable zoom range, with one example being 24-100 mm focal length, which may approximate a vertical FoV angle between 55 and 13 degrees. Use of a zoom lens also offers additional advantages in that a zoom lens permits a changeable FoV, which can increase pixel resolution in a particular region, such as for better gesture recognition. Further, by zooming in, the vision system can decrease the FoV and enable the ability to discern fingers that were not resolved in non-zoomed (larger FoV) state. The first lens 320 may further include a motorized focus, a motorized zoom, and a motorized iris (not shown in FIG. 3). The second lens 322 may be provided to adjust for the differences between the projection imager (not shown) and the image sensor 318. This allows for the ARFN 102 to set relative coverage of the two imagers (e.g., overscan/underscan).

The projector 316 projects an image that is reflected off an angled beam splitter 324 and out through the lens 320. For example, the beam splitter 324 may be embodied as a dichroic beam splitter having a coated prism assembly that employs dichroic optical coatings to divide light. For instance, the dichroic coating may reflect visible light while allowing IR light to pass through the coating. Alternatively, in other examples (not shown in FIG. 3), the dichroic coating may allow visible light to pass through while reflecting IR light. The projected image has a FoV represented by the outgoing pair of arrows 326. In this manner, the visible and high intensity light from the projector can be zoomed for image projection on a wide range of surfaces, from near view to far view surfaces.

A second ToF image sensor 328 may be included in a base-mounted head 330. Accordingly, the base-mounted head 330 may include a first ToF camera 332, while the arm-mounted head 302 may include a second ToF camera 334. In some examples, the base mounted head 330 may be adjustable to tilt upwards or downwards depending on the positioning of the ARFN 102, but may not be adjustable in as many degrees of freedom as the arm mounted head 302.

An illumination source 336 may be associated with the first ToF camera 332. In this example, the illumination source 336 includes one or more IR emitters 338, such as IR LEDs that are co-located with the first ToF camera 332. The one or more IR emitters 338 may be positioned in the base-mounted head 330 relative to a lens 340 of the first ToF camera 332, such as positioned around the lens 340 to emit IR light away from the image sensor 328, as represented by arrows 342. The IR illumination signals are scattered from the surfaces of objects in the scene and returned to the lens 340 and also to the lens 320 of the second ToF camera 334, as represented by the incoming arrows 344 and 346, respectively. In the first ToF camera 332, the received IR illumination signals 344 are passed through the lens 340 and optionally passed through an IR filter 348. For example, the IR filter 348 may filter out non-IR light and thereby reduce noise in the image received by the image sensor 328.

Similarly, in the second ToF camera 334, the reflected IR illumination signals 346 are received by the lens 320, passed through the dichroic beam splitter 324 to the secondary lens 322. The IR signals 346 are then optionally passed through an IR filter 348 to the image sensor 318. In other implementations, the IR signals may be passed directly to the image sensors 328 and 318, without going through the IR filters 348. Accordingly, in this example, the IR signals 342 are emitted out from the base-mounted head 330, scattered by the objects in the scene, and received by the image sensors 318 and 328 to create a mapping of the scene. The first ToF camera 332 may include wider FoV optics 350, and the second ToF camera, 334 may include narrower FoV optics 352. Accordingly, the first ToF camera 332 may have a wider FoV and the second ToF camera 334 may have a narrower FoV than the first ToF camera 332. Therefore, as discussed above, the first ToF camera 332 may be used to obtain a coarse depth mapping of the entire scene, or a larger portion of the scene, while the second ToF camera 334 may be used to obtain a higher resolution depth mapping of a particular region or a smaller portion of the scene.

The ARFN 102(2) or 102(3) in the example of FIG. 3 may also be equipped with one or more components in the base 304. In this example, the computing device 120 for executing the spatial analysis module 132 and other modules described above may reside in the base 304, along with power components 354 and one or more speakers 356. As discussed above with respect to FIG. 1, the computing device 120 may include a processor and memory to execute instructions. The spatial analysis module 132 may be executed by the computing device 120 to measure a ToF for an IR signal (or other modulated light output) emitted by the illumination source 336. ToF data values may be derived as a function of a time elapsed between emission from the IR LEDs 338 and capture by the image sensors 318 and 328. Alternatively, the ToF value may be derived as a function of the phase difference between the modulated IR illumination output and the returned IR illumination.

The spatial analysis module 132 may be implemented in software or hardware. Furthermore, in other implementations, the components shown as residing in the base 304 may reside in the head 302, arm mechanism 306, or elsewhere. For instance, the computing device 120 may be located in the head 302, and the speakers 356 may be distributed in multiple locations, including the base 304, arm mechanism 306 and/or the head 302. Additionally, in some implementations, any of the components described above, such as the ranging system 224, the transducer 222, or other components may be included in the head 302 or other part of the ARFN of FIG. 3.

In the implementation of FIG. 3, the projector 316 and the image sensor 318 share a common optical path through a common lens 320 on the projector side. Thus, the head 302 of the ARFN 102(2) and 102(3) of FIG. 3 may be made more compact to a smaller form factor than the ARFN 102(1) of FIG. 2, as one or more sets of lenses may be removed in this design as compared to the offset design discussed above with respect to FIG. 2. Accordingly, the orientation of the lens 320 indicates both a projection axis and optical ToF axis of the ARFN, which may be used for determining an orientation of the projection system and the ToF FoV.

FIG. 4 illustrates another implementation 400 of the ARFN 102(2) or 102(3), also shown implemented as resembling of a table lamp. This implementation differs from that of FIG. 3 in that the illumination source 336 shares the same optical path as the image sensor 328 through the lens 340. In FIG. 4, an IR laser 402 is used in place of the IR LEDs 338 of FIG. 3 as the illumination source 336. The IR laser 402 outputs an IR beam that is expanded by a beam expander 404 and then concentrated by a focus lens 406 onto an angled beam splitter 408. In one implementation, the angled beam splitter 408 is formed of a material that passes light (e.g., glass) and has a reflective patch 410 at its center. The focus lens 406 concentrates the IR beam onto the reflective patch 410 of the beam splitter 408, which directs the beam through lens 340 and out toward the scene as indicated by arrows 412. The reflective patch 410 covers the center portion of the beam splitter 408 and may have any number of shapes, such as circular, oval, polygonal, and so forth. With this arrangement, the size and area of interest can be controllably illuminated by use of the lens 340 and modulated IR laser light. The illuminated area may be roughly the same size, or slightly larger, than the area able to be mapped by the image sensor 328.

IR illumination signals scattered and reflected from the scene are received by the lenses 340 and 320 as indicated by dashed lines 414 and 416, respectively. In the case of the first ToF camera 332, the reflected IR signals 414 are passed through the lens 340, through the non-reflective portion of the angled reflector 408, through the filter 348, and to the image sensor 328. Accordingly, the collected scattered IR light may form an image on the image sensor 328. Similarly, in the case of the second ToF camera 334, the reflected IR signals 416 are passed through the lens 320, through the beam splitter 324, through the secondary lens 322, through the IR filter 348 and to the image sensor 318. The images received by the image sensors 318 and 328 may be used to compute time of flight values for depth analysis of the landscape of the scene or a portion of the scene.

By placing the IR laser 402 as shown, and passing the IR laser beam through the lens 340, the power used for illumination of a scene may be reduced as compared to the implementation of FIG. 3, where the IR LEDs are external to the optical path. Illumination typically degrades inversely proportional to the square of the distance. In FIG. 3, the forward and return paths result in an illumination inversely proportional to the distance to the power of four. Conversely, illumination through the same lens means that the returned light is inversely proportional to square of the distance, and therefore can use less intense illumination to achieve the same results.

The implementations of both FIGS. 3 and 4 may provide a smaller form factor than the implementation of FIG. 2. The projection and vision system allows for concurrent operation of the following functions: (1) visible light high intensity zoomable image projection with coaxial ToF signal reception and (2) coaxial illumination of a controlled area of interest with modulated IR light and collection of scattered IR light from a populated landscape to form an image on a image sensor.

Figure 5:
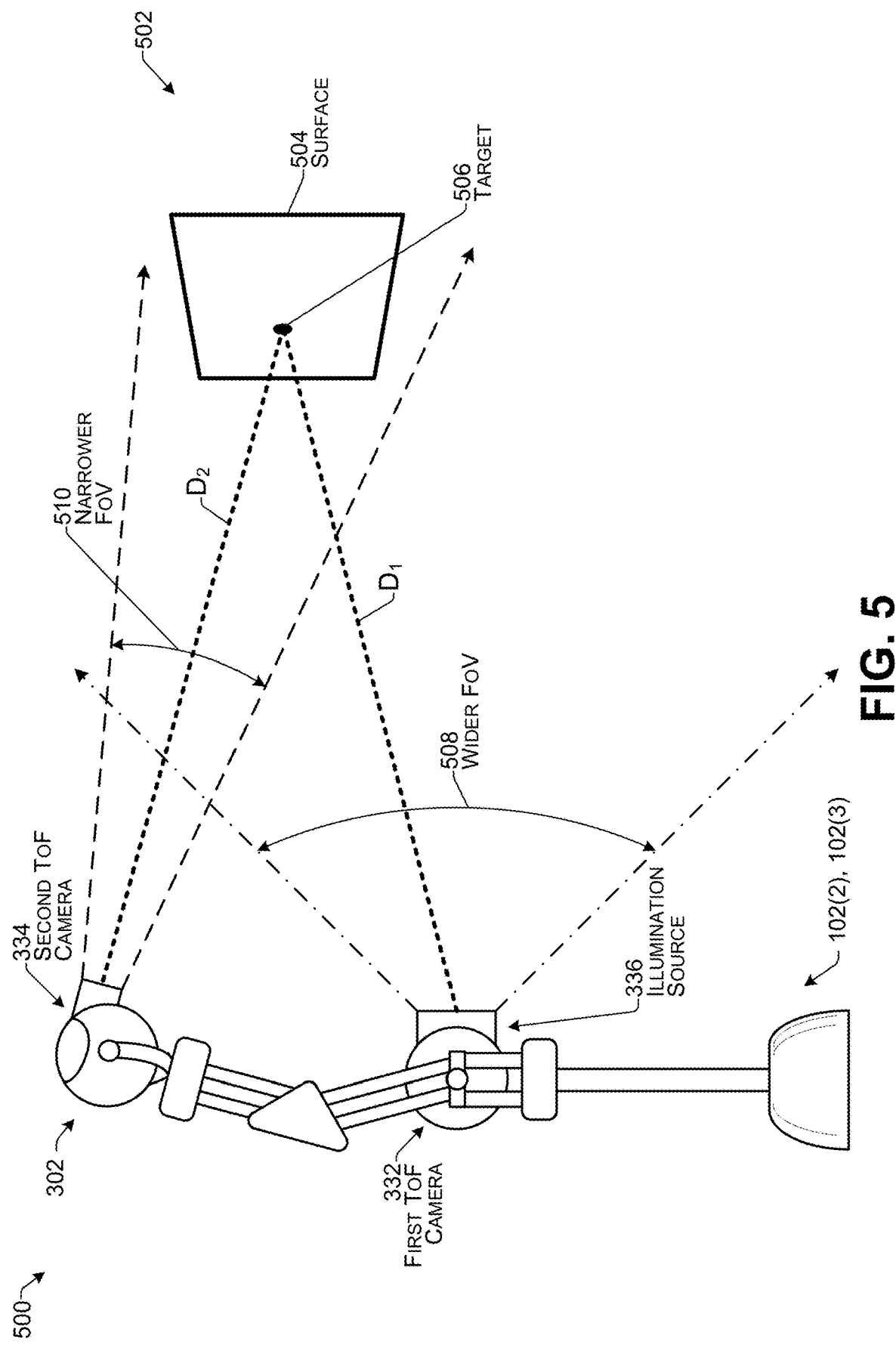
FIG. 5 illustrates an example vision system able to detect distances in a scene, with a first ToF camera co-located with an illumination source and a second ToF camera spaced away from the first ToF camera and the illumination source.

FIG. 5 illustrates an example ToF vision system 500 for detecting distances in a scene 502, such as for generating a depth mapping of the scene 502. The example of FIG. 5 is described in the context of the ARFN 102(2) or 103(3) described above with respect to FIGS. 3 and 4. However, in other examples, the ARFN 102(1) described above with respect to FIG. 2 may be used in a similar manner. In this example, the first ToF camera 332 is co-located with the illumination source 336, and the second ToF camera 334 is spaced a distance away from the first ToF camera 332 and the illumination source 336.

The scene 502 may include a surface 504 having a target 506. As one example, the surface 504 may be a projection display surface such as a projection screen, a wall, or the like. The projection display surface may be any suitable surface capable of receiving and reflecting light projected from the projector 316 (not shown in FIG. 5) to display an image. In some examples, the surface 504 may be a display medium such as a reflective sheet of a projection screen material, a reflective, lenticular or micro-faceted material, a wall or any other suitable surface. Further, the surface 504 may not necessarily be a flat surface, but may be a curved surface, a patterned surface, an irregular surface, or the like. For example, the display surface may include at least a portion having a curvature, such as in the shape of a concave or convex cylinder, hemisphere, etc. As one example, the target 506 may be on the surface 504. As another example, the target 506 may be an object in front of the surface 504, such as a hand of a user, or any other object.

The projector 316 (not shown in FIG. 5) included in the head 302 of the ARFN 102(2) or 102(3) may project an image onto the surface 504. The projected image may be a still image, i.e., a single frame, or a moving image, such as a video that includes multiple frames displayed sequentially. In some examples, a user may view and interact with the projected image, such as through hand gestures, or the like, as discussed above. Thus, the vision system 500 may be used for detecting and identifying hand gestures made by a user.

The illumination source 336 may be operated to illuminate the scene 502. For example, the illumination source 336 may produce a modulated signal of IR energy, such as having a modulation frequency between 70 and 100 MHz. The illumination signal reflects off the surfaces of objects in the scene 502, including the surface 504 and the target 506. The reflected illumination signal is received by the first ToF camera 332 and the second ToF camera 334. As discussed above, the first ToF camera 332 may have a wider FoV 508 than the second ToF camera 334, which has a narrower FoV 510. Accordingly, the first ToF camera 332 may generate ToF data for building a depth map of the entire scene 502 captured within the wider FoV 508. On the other hand, the second ToF camera 334 may generate ToF data for building a depth map of the surface 504 including the target 506 within the narrower FoV 510.

The ToF distance $D_1$ for the first ToF camera 332 may be determined in a conventional manner. For example, a phase delay between emitted and received IR signals may be measured to calculate the distance for each sensor pixel to a reflecting surface in the scene that corresponds to the sensor pixel. Accordingly, the distance $D_1$ from the first ToF camera 332 to the target 506 may be determined as follows:

$$D_1 = (c/2)(\Delta\varphi_1/2\pi f) \qquad \text{Equation (1)}$$

where c is the speed of light, $\Delta\varphi_1$ is the phase shift or delay measured at the first image sensor, and f is the modulation frequency.

Furthermore, after the distance $D_1$ has been determined, the distance $D_2$ from the second ToF camera 334 to the target 506 may be determined as follows:

$$D_2 = c(\Delta\varphi_2/2\pi f) - D_1 \qquad \text{Equation (2)}$$

where $\Delta\varphi_2$ is the phase shift or delay measured at the second image sensor.

Accordingly, distance information may be generated for each pixel in each of the image sensors of the first ToF camera 332 and the second ToF camera 334. Depth mapping information may then be generated from the ToF distance data collected by each of the respective ToF cameras 332 and 334. Since the first ToF camera 332 has a considerably wider FoV 508 than the second ToF camera 334, the depth mapping created from the ToF data collected by the first ToF camera 332 corresponds to a larger part of the scene 502 and therefore is of lower resolution. For example, a typical ToF image sensor may be a CCD (charged coupled device) image sensor, a CMOS (complementary metal-oxide-semiconductor) image sensor, or the like, and may have a resolution of e.g., 192×108 pixels, 352×288 pixels, 640×480 pixels, etc. Accordingly, by focusing the second ToF camera 334 having the narrower FoV 510 on the desired target 506, a higher-resolution mapping of the portion of the scene 502 including the target 506 may be generated from the ToF distance data collected by the second ToF camera 334. Furthermore, while the illumination source 336 is shown as being co-located with the wider FoV camera 332 in this example, in other examples, the illumination source 336 may be co-located with the narrower FoV camera 334. Numerous other variations will be apparent to those of skill in the art having the benefit of the disclosure herein.

Figure 6:
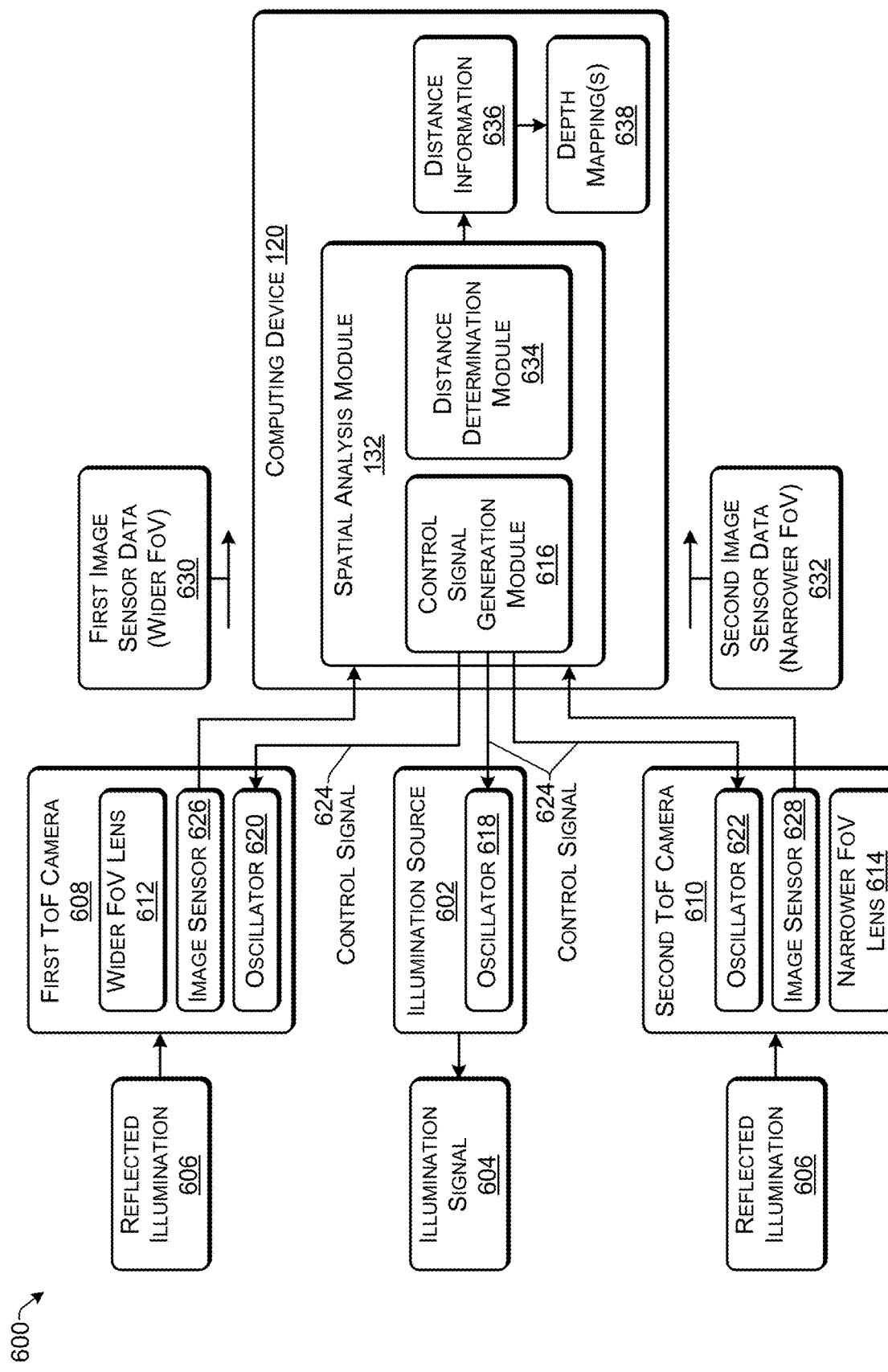
FIG. 6 illustrates an example framework for determining distance information from multiple ToF cameras based on illumination from a single illumination source.

FIG. 6 illustrates an example framework 600 for determining distance information from multiple ToF cameras using illumination from a single illumination source. In this example, an illumination source 602 generates an illumination signal 604, such as a modulated infrared signal as discussed above. The illumination signal 604 is reflected off one or more surfaces such as surfaces of objects or other portions of the scene as reflected illumination 606. The reflected illumination 606 is received by a first ToF camera 608 and a second ToF camera 610. For instance, the first ToF camera 608 may include a wider FoV lens 612 and the second ToF camera 610 may include a narrower FoV lens 614.

As mentioned above, a control signal may be generated to synchronize the illumination source 602 with the first ToF camera 608 and/or the second ToF camera 610. In this example, a control signal generation module 616 is executed by the computing device 120 such as in association with the spatial analysis module 132. Alternatively, the control signal may be generated by a separate piece of hardware, an independent driver, or by other suitable techniques. In this example, the illumination source 602 may include a clock or other type of oscillator 618, the first ToF camera 608 may include a clock or other type of oscillator 620, and the second ToF camera 610 may include a clock or other type of oscillator 622. Accordingly, a control signal 624 from the control signal generation module 616 may be generated to synchronize the oscillators 618, 620 and 622. Furthermore, in the case that the first ToF camera 608 and the illumination source 602 are co-located, a single oscillator 618 may be used for both components and the oscillator 620 may be eliminated.

Synchronization may help ensure that the same control signal is used for operation of the illumination source 602, the first ToF camera 608, and the second ToF camera 610. As a result, a time difference between the control signal and the actual effect of the control signal at each component is consistent. In the illustrated example, the control signal generation module 616 may transmit the control signal 624 to the illumination source 602 and the first and second ToF cameras 608 and 610, respectively. The oscillators 618, 620 and 622 at each of these components may be phase locked to the incoming control signal 624 by a phase locked loop. For example, each oscillator 618, 620 and 622 may include or may be set by its own control signal generator block that phase locks to the incoming control signal 624. The control signal generator blocks associated with each oscillator may be implemented in hardware, such as by an integrated circuit (e.g., a CMOS). The phase locking synchronizes the frequencies of the multiple oscillators 618, 620 and 622, but allows differences in phase. After the phase locked loop has been established, a calibration procedure may be used to measure the time difference between a locally generated control signal generated by an oscillator 618, 620 or 622 and the incoming control signal 624 from the control signal generation module 616. For example, a local signal generated by the oscillator 622 associated with the second ToF camera may be calibrated based at least in part on a measured time difference between the local signal and the control signal 624.

Using the common control signal 624, a first image sensor 626 associated with the first ToF camera 608 and a second image sensor 628 associated with the second ToF camera 610 may be operated or modulated at the same frequency in synchronization with the illumination source 602. As one example, a differential structure for each pixel in the image sensor 628 or 626 accumulates photo-generated charges in two collection nodes using two modulated gates. The gate modulation signals are synchronized with the modulation signal of the illumination source 602 using the common control signal 624. Depending on the phase of incoming reflected illumination, one node collects more charges than the other node. At the end of integration, the voltage difference between the two nodes is read out as a measure of the phase of the reflected illumination. Accordingly, when the reflected illumination 606 is received by the first image sensor 626 and the second image sensor 628, a phase difference between the original illumination signal 604 and the reflected illumination signal 606 may be detected. The first ToF camera 608 may provide first image sensor data 630 to the computing device 120, and the second ToF camera 610 may provide second image sensor data 632 to the computing device 120. Thus, the first image sensor data 630 corresponds to the wider FoV and the second image sensor data 632 corresponds to the narrower FoV. In some examples, the image sensor data 630 and 632 may be the phase difference for each pixel in the images sensors 626 and 628, respectively. In other examples, the image sensor data 630 and 632 may be time data for each pixel. In still other examples, the image sensor data 630 and 632 may be distance data for each pixel or other derivative data that may be used to generate a depth mapping.

Based on the common control signal, the distance between an object and the ToF cameras 608 and 610 can be calculated using equation (1) and equation (2), respectively, as discussed above. As one example, the spatial analysis module 132 may include a distance determination module 634 that determines distance information 636. The distance information 636 may include a first distance $D_1$ from the wider FoV ToF camera 608 that may be co-located with the illumination source 602, as discussed above with respect to equation (1). Subsequently, as discussed above with respect to equation (2), a total distance from the illumination source 602 to the object and from the object to the narrower FoV ToF camera 610 may be determined based on the second image sensor data 632 output by the second ToF camera 610. The first distance $D_1$ may be subtracted from the total distance to obtain the second distance $D_2$, which is the distance from the object to the second ToF camera 610. Alternatively, in some examples, the distance information 636 may be determined by the ToF cameras 332 and 334, rather than the computing device 120.

When distance information 636 has been determined for each pixel the spatial analysis module 132 may further determine a depth mapping 638 for the scene. For instance, the data from the ToF camera may be used to produce a depth image or mapping 638, in which each pixel of the mapping indicates the distance to the corresponding point in the scene. Thus, a first depth mapping 638 of substantially the entire scene captured by the wider FoV may be determined from the first image sensor data 630 corresponding to the wider FoV. Additionally, a second depth mapping 638 may be determined for a smaller portion of the scene upon which the second ToF camera 610 is currently focused based on the second image sensor data 632 obtained from the second ToF camera 610 having the narrower FoV.

Figure 7:
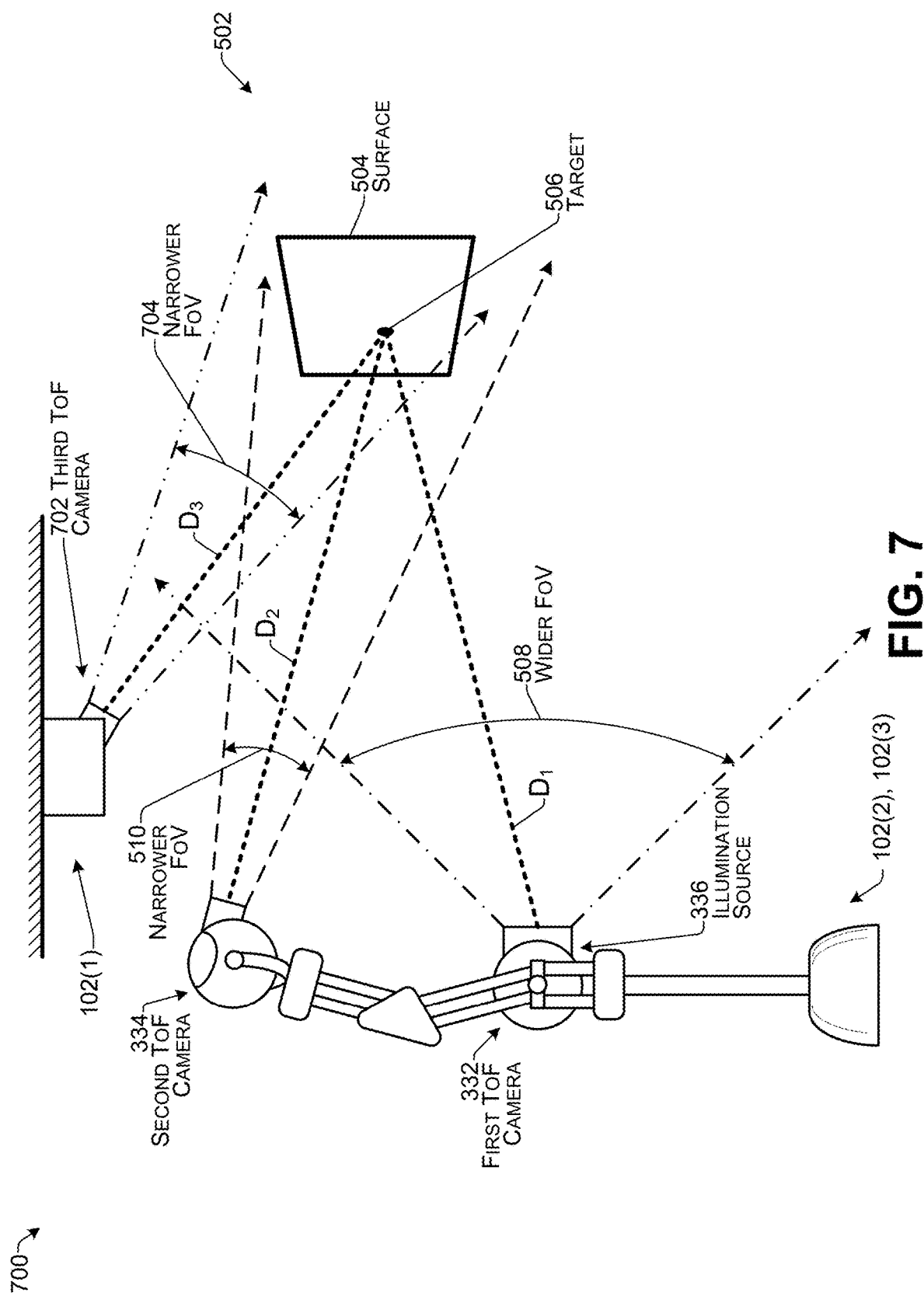
FIG. 7 illustrates an example vision system having two narrower field of view (FoV) ToF cameras and one wider FoV ToF camera having a co-located illumination source. The two narrower FoV ToF cameras are spaced apart from each other and from the wider FoV ToF camera.

FIG. 7 illustrates an example of a vision system 700 that includes multiple ToF cameras and a single illumination source. In this example, a third ToF camera 702 is included with the vision system 700 and may be configured to have a narrower FoV 704. For instance, the third ToF camera 702 may correspond to the second ToF camera 212 discussed above with respect to FIG. 2. Alternatively, the third ToF camera 702 may be included in a second ARFN 102(2) or 102(3) (not shown in FIG. 7). The narrower FoV 704 of the third ToF camera 702 may be approximately the same, more narrow or less narrow than the FoV 510 of the second ToF camera 334, but narrower than the FoV 508 of the first ToF camera 332. A distance $D_3$ from the target 506 to the third ToF camera 702 may be calculated using equation (2) above in a manner similar to the calculation of the distance $D_2$. The third ToF camera 702 may be synchronized, such as by a phase locked loop, with the illumination source 336 using a phase locking control signal, as discussed above with respect to FIG. 6.

The inclusion of the third ToF camera 702 in the vision system 700 may enable the vision system 700 to perceive a particular object, such as the target 506, from multiple angles for obtaining more information about the particular object. Additionally, in the case that the FoV of one of the narrower FoV ToF cameras 334 or 702 is partially obstructed by other objects or by another portion of the vision system 700, the other one of the narrower FoV ToF cameras 334 or 702 may obtain depth information for the target 506. In addition, as an alternative, the second ToF camera 334 may be focused on a first object, such as a left hand of a user, and the third ToF camera 702 may be focused on a second object, such as a right-hand of the user.

Figure 8:
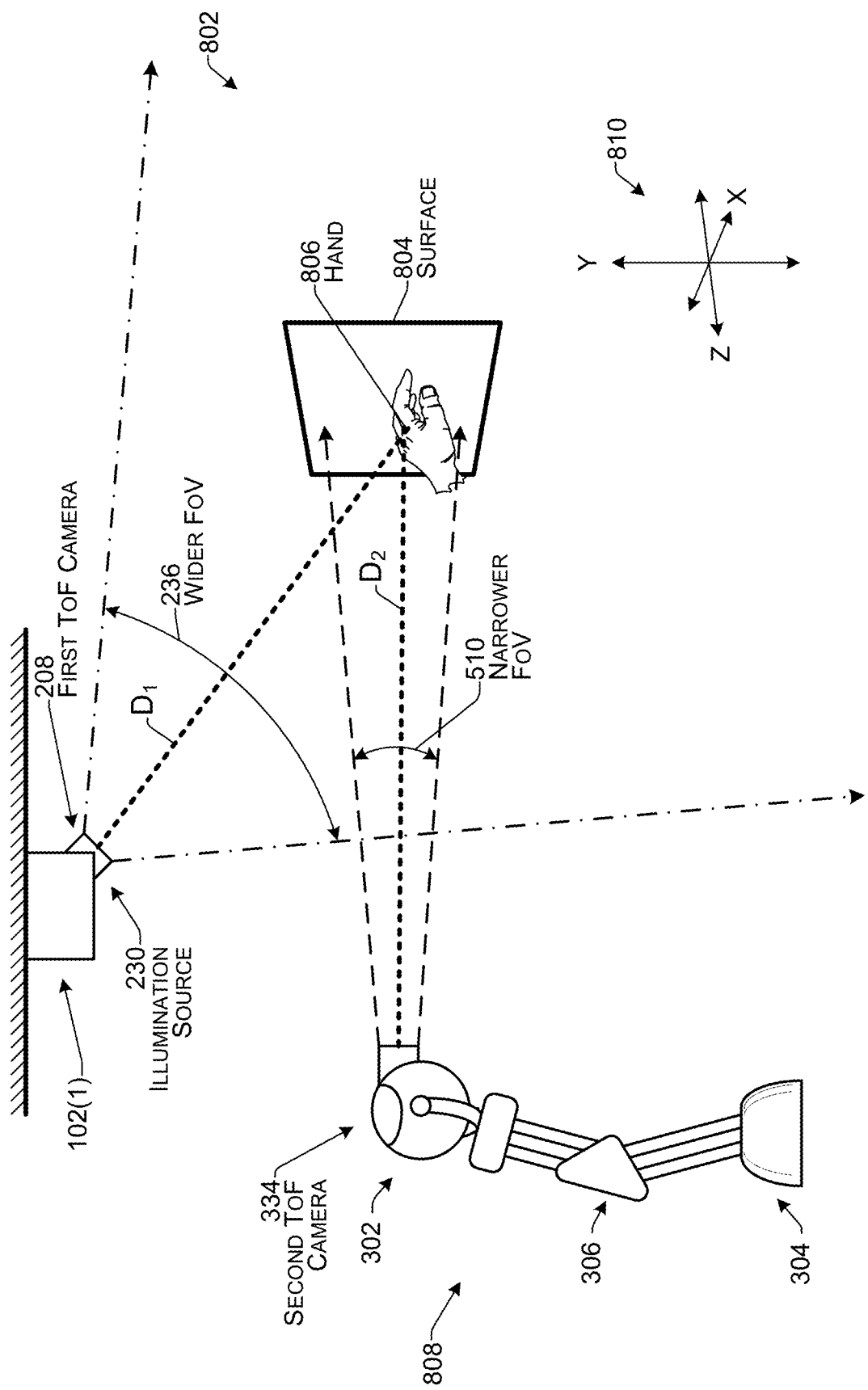
FIG. 8 illustrates an example vision system able to detect distances in a scene, with a first ToF camera co-located with an illumination source and a second ToF camera spaced away from the first ToF camera and the illumination source.

FIG. 8 illustrates an example vision system 800 having multiple ToF cameras and a single illumination source. In this example, an ARFN 102(1), as described above with respect to FIG. 2 includes a first ToF camera 208 as described above. For instance, the first ToF camera has a wider FoV 236. Furthermore, the illumination source 230 may be co-located with the first ToF camera 208. As described above, the first ToF camera 208 may be positioned by one or more motors to be oriented toward a scene 802. In this example, the scene 802 includes a surface 804 and an object such as a hand 806 of a user. In some cases, the surface 804 may be a projection surface for displaying a projected image, as discussed above with respect to FIG. 5.

The vision system 800 further includes a second ToF camera 334 included in the arm-mounted head 302 of an ARFN 808. The ARFN 808 in this example is similar to the ARFNs 102(2) and 102(3) described above with respect to FIGS. 3 and 4, but the base-mounted head 330 is not included. Thus, the ARFN 808 includes the second ToF camera 334 having the narrower FoV 510, and may include the other components of the head 302 described above with respect to FIGS. 3 and 4. In the example of FIG. 8, the distance values $D_1$ and $D_2$ may be calculated as discussed above using equations (1) and (2) respectively. Further, as described above, a projector 316 in the head 302, and/or a projector 206 in the ARFN 102(1) may be used to project an image onto the surface 804.

FIG. 8 shows the hand 806 of a user as an example object within the scene 802 that may be detected by the vision system 800. For example, the first ToF camera 208 may initially provide ToF data used to generate a depth mapping of the scene 802. From the depth mapping, the spatial analysis module 132 may determine there is a likelihood that a hand of a user is within the scene 802. Accordingly, the computing device 120 may aim and focus the second ToF camera 334 at a particular portion of the scene 802 that includes the hand 806. Thus, the second ToF camera 334 may begin to obtain ToF data at a higher resolution in the portion of the scene 802 that includes the hand 806. To identify hand gestures, the vision system 800 detects and tracks the hand 806 within the narrower FoV 510 of the second ToF camera 334. For example, a plurality of depth maps may be generated over a period of time from the data received from the second ToF camera. Based on changes in the plurality of depth maps detected over the period of time, the computing device is able to recognize one or more gestures made by the hand 806.

As discussed above, spatial analysis module 132 executable on the computing device 120 may generate one or more depth maps from the ToF data obtained by the first ToF camera 208 and the second ToF camera 334 in the vision system 800. The depth mapping may be used to identify the hand 806 of the user, and to determine changes in the location and position of the hand 806 over time. Specifically, the ToF data may be used to identify a sequence of hand positions or poses that form a hand gesture that is recognizable by the gesture recognition module 152 discussed above. As one example, when a gesture has been recognized by the gesture recognition module 152, the processing module 154 may determine an action to be performed in response to the detected gesture.

A hand gesture may be defined by a series of poses of the hand 806, where each pose indicates the 3D position of the hand 806 and the 3D angular orientation of the hand 806.

Position and angular orientation may be evaluated as absolute positions and orientations or as relative positions and orientations. As an example, 3D position coordinates may be specified relative to orthogonal X, Y, and Z axes of a global coordinate system 810 for the environment. 3D angular orientations may be specified as rotations about the X, Y, and Z axes. Furthermore, the orientation of the display surface(s) and/or the orientation of the head 302 of the ARFN 808 may be determined based on the global coordinate system 810 for the environment. For example, a horizontal surface may generally be in the plane of the X and Z axes, while a vertical surface may generally include the Y axis as a component.

Figure 11:
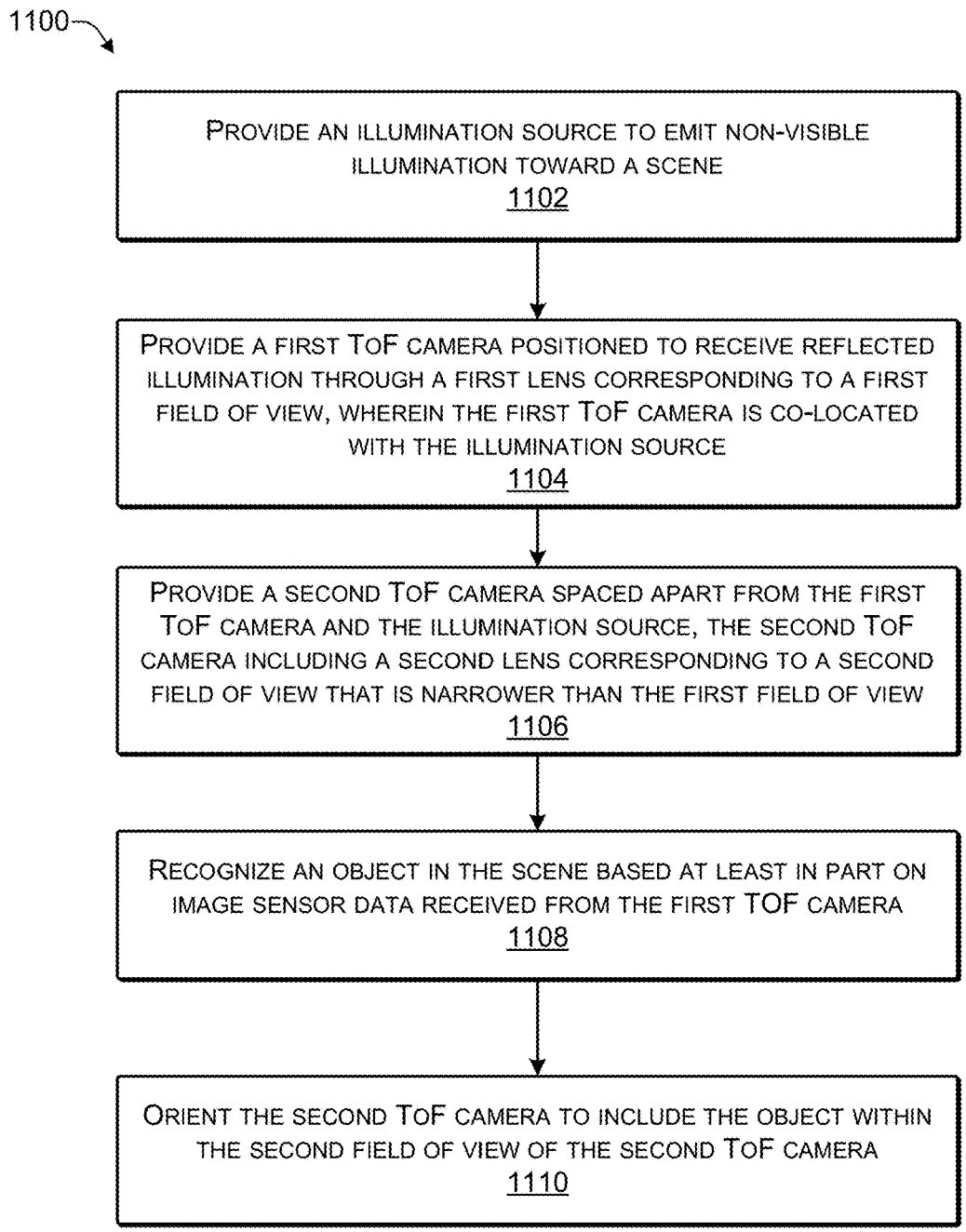
FIG. 11 is an example flow diagram of a process for controlling a vision system including a first ToF camera co-located with an illumination source and second ToF camera.

FIGS. 9-11 show illustrative processes for controlling a vision system according to some implementations. The processes described herein may be implemented by the architectures and systems described herein, or by other architectures and systems. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation. It is understood that the following processes may be implemented with other architectures as well.

FIG. 9 is a flow diagram of a process 900 for a vision system having multiple ToF cameras according to some implementations. In some examples, the process 900 may be executed, at least in part, by one or more modules of the computing device 120 discussed above with respect to FIG. 1.

At 902, a first ToF camera is co-located with an illumination source. For example, the first ToF camera may include a first image sensor. Furthermore, the illumination source may be configured to emit modulated illumination. For example, the illumination source may emit modulated infrared energy that is not visible to the human eye.

At 904, a second ToF camera including a second image sensor is provided in a location that is spaced away from the first ToF camera and the illumination source. For example, the second ToF camera may be synchronized with the illumination source and the first ToF camera such as for modulation at the same frequency.

At 906, the computing device may receive first data from the first image sensor, the first data based at least in part on a first portion of reflected modulated illumination received by the first image sensor. For example, the first data may indicate time of flight information to one or more surfaces or objects in a scene.

At 908, the computing device may receive second data from the second image sensor, the second data based at least in part on a second portion of reflected illumination received by the second image sensor. For example, the second data may indicate time of flight information to one or more objects or surfaces in the scene.

At 910, the computing device may determine a distance from a surface in the scene to the second ToF camera based at least in part on the first data and the second data. For example, the computing device may first determine a first distance from the first ToF camera to the surface based on the first image sensor data. The computing device may then subtract the first distance from a total distance determined based on time of flight information determined from the second image sensor data.

FIG. 10 is a flow diagram of a process 1000 for a vision system having multiple ToF cameras according to some implementations. In some examples, the process 1000 may be executed, at least in part, by one or more modules of the computing device 120 discussed above with respect to FIG. 1.

At 1002, a first ToF camera and a second ToF camera are spaced away from one another. For example, the first ToF camera includes a first image sensor, the second ToF camera includes a second image sensor, and the first ToF camera includes a co-located illumination source.

At 1004, a frequency of modulation of illumination emitted by the illumination source is synchronized with a frequency of modulation of the first image sensor and a frequency of modulation of the second image sensor. For example, a control signal may be provided to synchronize the modulation frequency of the illumination source with a modulation frequency of the second image sensor.

FIG. 11 is a flow diagram of a process 1100 for a vision system having multiple ToF cameras according to some implementations. In some examples, the process 1100 may be executed, at least in part, by one or more modules of the computing device 120 discussed above with respect to FIG. 1.

At 1102, an illumination source is provided to emit infrared or other non-visible illumination toward a scene.

At 1104, a first ToF camera is positioned to receive reflected illumination through a first lens corresponding to a first field of view. For example, the first ToF camera is co-located with the illumination source.

At 1106, a second ToF camera is spaced apart from the first ToF camera and the illumination source. For example, the second ToF camera may include a second lens corresponding to a second field of view that is narrower than the first field of view.

At 1108, the computing device recognizes an object in the scene based at least in part on image sensor data received from the first ToF camera. For example, computing device may receive a depth mapping of the overall scene from the first ToF camera. The computing device may recognize an object in the depth mapping corresponding to an object of interest, such as a hand of a user or other object.

At 1110, the computing device orients the second ToF camera to include the object within the second field of view of the second ToF camera. For example, the computing device may cause the second camera to aim at, focus on, or zoom in on the object identified by the computing device. Accordingly, the second camera may focus on the object with a narrower field of view and thereby obtain higher-resolution ToF data for the object.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a light source to illuminate a scene, the light source including a first emitter and a second emitter;

a first time of flight (ToF) camera including a first lens and a first image sensor, the first lens providing a first field of view;

a second ToF camera including a second lens and a second image sensor, the second lens providing a second field of view that is narrower than the first field of view; and one or more computer-readable media storing instructions which, when executed by the one or more processors, cause the one or more processors to be configured to:

receive first data from the first image sensor, the first data based at least in part on first light reflected off an object within the first field of view;

determine, based at least in part on the first data, a location of the object; and orient, based at least in part on the location of the object, the second ToF camera to include the object within the second field of view, the orienting including adjusting a zoom parameter of the second ToF camera.

2. The system as recited in claim 1, the instructions further causing the one or more processors to be configured to modulate the second image sensor at a same frequency used to modulate the light from the light source.

3. The system as recited in claim 1, wherein the first emitter and the second emitter comprise at least one of infrared light emitting diodes, infrared lasers, or infrared laser diodes.

4. A method comprising:

positioning a first time of flight (ToF) camera with a light source in a scene, the first ToF camera including a first image sensor;

positioning a second ToF camera spaced away from the first ToF camera, the second ToF camera including a second image sensor;

receiving, from the first image sensor, first data corresponding to the scene;

identifying, from the first data, an object within the scene;

orienting, based at least in part on the identifying, the second ToF camera to include the object within a field of view of the second ToF camera, the orienting including adjusting a zoom parameter of the second ToF camera; and receiving, from the second image sensor, second data representing the object at a higher resolution relative to the first data.

5. The method as recited in claim 4, further comprising providing a control signal to the second ToF camera and at least one of the first ToF camera or the light source.

6. The method as recited in claim 5, further comprising executing one or more processors to provide the control signal.

7. The method as recited in claim 4, further comprising:

generating a depth map of a scene within a field of view of the first ToF camera based at least in part on the first data; and wherein identifying the object is based at least in part on the depth map.

8. The method as recited in claim 4, wherein the object is a hand of a user, the method further comprising recognizing, based at least in part on the second data, at least one gesture made by the hand; and performing, based at least in part on the at least one gesture, an operation.

9. The method as recited in claim 4, further comprising determining, based at least in part on a phase difference between first light emitted by the light source and second light received by the second ToF camera, a distance from the second ToF camera to a surface of the object.

10. The method as recited in claim 4, further comprising determining, based at least in part on the first data and the second data, a distance from a surface of the object to the second ToF camera.

11. The method as recited in claim 4, further comprising determining, based at least in part on echolocation, a distance between the second ToF camera and the object.

12. A system comprising:

a light source including a first emitter and a second emitter, the first emitter and the second emitter emitting non-visible light toward a scene;

a first time of flight (ToF) camera positioned between the first emitter and the second emitter, the first ToF camera configured to receive first light reflected off an object through a first lens corresponding to a first field of view;

a second ToF camera spaced apart from the first ToF camera and the light source, the second ToF camera including a second lens corresponding to a second field of view that is narrower than the first field of view; and a processor configured by one or more executable instructions to:

recognize, based at least in part on first data received from the first ToF camera, the object within the scene;

orient, based at least in part on recognizing the object within the scene, the second ToF camera to include the object within the second field of view, the orienting including adjusting a zoom parameter of the second ToF camera; and receive, based at least in part on orienting the second ToF camera, second data representing the object at a higher resolution relative to the first data.

13. The system as recited in claim 12, wherein the processor is further configured generate, based at least in part on the first data and the second data, a depth map of the scene.

14. The system as recited in claim 12, wherein the second data is based at least in part on a phase difference between the non-visible light emitted by the light source and second light received by the second ToF camera.

15. The system as recited in claim 12, wherein adjusting the zoom parameter of the second ToF camera comprises at least adjusting an optical zoom of the second ToF camera to zoom in on the object.

16. The system as recited in claim 12, wherein the processor is further configured provide a control signal to the second ToF camera and at least one of the light source or the first ToF camera, the control signal synchronizing a frequency of modulation of the non-visible light emitted by the light source with a frequency of modulation of an image sensor of the second ToF camera.

17. One or more non-transitory computer-readable media maintaining instructions which, when executed by one or more processors, cause the one or more processors to perform acts comprising:

receiving, from a first time of flight (ToF) camera, first image sensor data corresponding to first light reflected off an object within a scene;

identifying, from the first image sensor data, a location of the object within the scene and a first distance from the first ToF camera to a surface of the object;

orienting, based at least in part on the identifying, the second ToF camera to include the object within a field of view of the second ToF camera, the orienting including adjusting a zoom parameter of the second ToF camera;

receiving, from the second ToF camera, second image sensor data corresponding to second light reflected off the object, the second image sensor data representing the object at a higher resolution relative to the first image sensor data; and determining, based at least in part on the second image sensor data and the first distance, a second distance from the second ToF camera to the surface of the object.

18. The one or more non-transitory computer-readable media as recited in claim 17, wherein the second image sensor data is based at least in part on a phase difference between light emitted by a light source and the second light.

19. The one or more non-transitory computer-readable media as recited in claim 17, the acts further comprising providing a control signal to the second ToF camera and the first ToF camera, the control signal synchronizing a frequency of modulation of light emitted by a light source with a frequency of modulation of an image sensor of the second ToF camera.

* * * * *